United States Patent [19]

Mortoly, Jr. et al.

[11] Patent Number: 5,505,812

[45] Date of Patent: Apr. 9, 1996

[54] ARTICULATED GLUE APPLICATOR CONVEYOR

[75] Inventors: John L. Mortoly, Jr., Poughkeepsie; Bradley S. Quick, Staatsburg, both of N.Y.

[73] Assignee: James L. Taylor Mfg. Co., Inc., Poughkeepsie, N.Y.

[21] Appl. No.: 183,672

[22] Filed: Jan. 18, 1994

[51] Int. Cl.$^6$ .................................................. B32B 31/00
[52] U.S. Cl. ........................... 156/364; 156/363; 156/563; 156/566; 156/578; 118/413
[58] Field of Search ..................... 118/413, 414, 118/429; 156/356, 362, 363, 364, 563, 566, 578

[56] References Cited

U.S. PATENT DOCUMENTS

| | | | |
|---|---|---|---|
| 2,928,442 | 3/1960 | Adams et al. | 156/362 |
| 3,003,541 | 10/1961 | Prentice et al. | 156/362 X |
| 3,483,065 | 12/1969 | O'Brien | 156/364 X |
| 3,616,090 | 10/1971 | Larson | 156/566 X |
| 3,625,803 | 12/1971 | Masulis et al. | 156/364 X |
| 3,715,259 | 2/1973 | Gordon | 156/363 |
| 3,723,227 | 3/1973 | Oono et al. | 156/578 X |
| 4,314,871 | 2/1982 | Weinstock et al. | 156/578 X |
| 4,797,169 | 1/1989 | Aizawa et al. | 156/563 X |
| 4,842,669 | 6/1989 | Considine | 156/563 X |

Primary Examiner—David A. Simmons
Assistant Examiner—Paul M. Rivard
Attorney, Agent, or Firm—Weingram & Zall

[57] ABSTRACT

The present invention sets forth an automatic gluing and conveying system for use with an automated clamp tightener and flattener system in which the conveyor system is capable of moving transversely to the path of conveying in order to accommodate movement of portions of the clamp carrier which interfere the conveying path. An electronic controlling means controls the movement of the conveyor along the conveying path, movement of the conveyor perpendicular to the conveying path, and coordinates movement of the clamp carrier. Also provided is a method for gluing segments of wood to be formed into panels by a gluing process which is controlled by an electronic control system which coordinates movement of the conveyor along a conveying path and movement of the conveying means perpendicular to the conveying path and movement of a clamp carrier apparatus which overlaps the conveying path.

23 Claims, 7 Drawing Sheets

ARTICULATED GLUE APPLICATOR CONVEYOR

BACKGROUND OF THE INVENTION

1. Field of the Invention

This invention relates to wood gluing machinery and more particularly to an automatic gluing and conveying means which coacts with clamp carriers for automatically applying glue to wood segments and positioning the glued wood segments at appropriate stations for placement of the wood segments into a clamping apparatus. The conveying apparatus includes an articulated portion which enables the conveyor path to traverse the path of the clamping apparatus without interfering with the clamping apparatus.

2. Description of the Prior Art

Clamp carriers have been used for many years to facilitate the manufacturing process by which individual segments of wood may be formed into panels by gluing the edges of the wood segments together. These clamp carriers have become sophisticated and have evolved to enable rapid tightening and loosening of the individual clamps to facilitate loading and unloading of the wood segments and panels to and from the clamps. The clamps in each rank are grouped into clamping sections relating to the separate panels being formed, which have been built to hold up to forty ranks of six or more clamps each. U.S. Pat. Nos. 3,771,779, 4,624,451, 5,006,193, the entire disclosures of which are incorporated herein by reference, show developments in the automated clamp tighteners and flatteners.

Because of the increased efficiency of these automated clamp tighteners and flatteners, they are capable of gluing a very large number of wood segments in a given time. This has placed an increasing burden on the operator of the machine. The operator of the machine has to stack and unstack the wood segments and glued panels from the machine and additionally apply glue to the edges of the individual wood segments so that when the segments are placed in the clamp rack and the clamp is tightened, the glue will bond the individual segments into a unitary panel.

The gluing cannot be carried out far from the clamping area since wet glue on the individual panels would tend to contact various areas of the machinery causing numerous problems to the machinery and to the operators.

In the past, small gluing devices were placed behind the operator's station and the clamp carrier operator would apply glue to the individual segments of wood. The operator would then manually load the glued segments directly into the clamp carrier after the application of the glue. This required excessive movement and time on the part of the operator, often making the operator the weakest link in the manufacturing process. If the operator could not apply glue to the wood segments, load and unload the clamps at maximum speed settings for the apparatus, then the apparatus would have to be slowed or an additional worker used just to apply glue to the wood segments.

Additionally, it was desirable to have some automated gluing apparatus which could bring the wood to the location where it was to be placed in the clamping equipment. Due to the nature of the automated or manual clamp carriers, however, this could not be effectively done because when the conveyor was placed close enough to the location of the clamps, the paths of the conveyor and clamps interfered.

Combining an automated glue applicator with a conveyor was an improvement but still did not accomplish the task of bringing wood segments with glue to a location close enough to effectively reduce the burden on the operator of the clamp carrier.

SUMMARY OF THE INVENTION

The present invention sets forth an automatic gluing and conveyor system for use with a clamp carrier in which a section of the conveyor system is capable of moving transversely to the path of the conveyor in order to accommodate movement of portions of the clamp carrier which overlap, or interfere with, the conveying path. Electronic controlling means control the movement of the conveyor sections and movement along the conveying path, movement of the conveyor perpendicular to the conveying path, and coordinates the conveyor movement with movement of the clamp carrier.

Also provided is a method for gluing segments of wood to be formed into panels by means of a gluing process which process includes movement of wood segments along a conveying path; transverse movement of the conveying means perpendicular to the conveying path; movement of a clamp carrier apparatus which overlaps the conveying path; coordination of the gluing process; transverse motion of the conveying means; and operation of the clamp carrier.

Accordingly, it is an object of the invention to provide an articulated conveying apparatus which automatically applies glue to wood segment groups to be formed into panels, and to coordinate the glue application with operation of the clamp carrier.

Another object of the invention is to provide an articulated conveying apparatus which automatically positions the wood segments for placement in the clamp sections of the clamp carrier to form panels.

Still another object of this invention is to provide an articulated conveying apparatus which controls and monitors the system to provide for the joint operation of the conveyor apparatus and clamp tightener.

Yet another object of the invention is to provide an articulated conveying apparatus which automatically applies the requisite amount of glue to the segments of wood to be formed into panels in a clamp carrier.

Still another object of this invention is to provide an articulated conveying apparatus which can traverse the path of moving equipment movement without interference.

A further object of this invention is to provide an articulated conveying apparatus which can move in a perpendicular direction to the conveying path of the conveyor.

Yet another object of the invention is to enable powering of the multiple units of an articulated conveying apparatus by means of a single drive motor.

A still further object of the invention is to provide an articulated conveying apparatus which has a means for transferring power from a stationary conveyor segment to an articulated conveyor segment.

Still another object of the invention is to provide an articulated conveying apparatus which coacts with a multiple section clamp carrier which operates without interference from the conveyor apparatus that brings wood segments directly over the clamping unit.

Another object of this invention is to provide an articulated conveying apparatus which coordinates movement of the clamp section with the positioning of the conveyor segments.

Still yet another object of this invention is to provide an articulated conveying apparatus which coordinates the position of the rest bar of the clamp carrier with the position of the conveyor to allow for rotation of the clamp carrier.

A further object of the invention is to provide an articulated conveying apparatus which coordinates movement of the front panel, clamp sections, conveyor segments, and segments of wood on the conveyor.

Another object of the invention is to provide an articulated conveying apparatus which automatically starts, stops, and positions the wood segments with relation to the clamping station.

Yet another object of the invention is to provide an articulated conveying apparatus which automatically indexes the conveyor segment.

A further object of the invention is to provide an articulated conveying apparatus which automatically starts and stops the conveyor segments.

Yet another object of the invention is to provide an articulated conveying apparatus which provides for the easy engagement and disengagement of the articulated section of the conveyor with the stationary section of the conveyor.

A still further object of the invention is to provide an articulated conveying apparatus which is durable, reliable, and safe to operate.

An additional object of this invention is to provide an articulated wood conveyor which can operate in a harsh environment and operate for long periods of time while minimizing the use of labor.

Another object of the invention is to provide a method for automatically applying glue during the operation of the automatic clamp tightener.

A still further object of the invention is to provide a method for coordinating the loading, gluing, and drying of wood segments to be formed into panels.

Yet another object of the invention is to provide a method for the coordination and the positioning of the conveyor with respect to the clamping mechanisms.

Another object of the invention is to provide a method which enables a single operator to load glue and operate the automatic clamp tightener with a minimal amount of down time for each unit.

Yet still another object of the invention is to provide a method that automatically spaces groups of wood segments to be glued and positioned for easy loading into the clamps.

Yet another object of this invention is to provide a method which moves pre-glued wood segments across a path of interfering, moving equipment.

Another object of this invention is to provide for the manual adjustment of the position of the glued wood segments.

Further objects and advantages of the invention will appear from the following description of an illustrative embodiment of the invention, the novel features of the invention being pointed out in the appended claims.

BRIEF DESCRIPTION OF THE DRAWINGS

The invention will be described will reference to the accompanying drawings in which.

DETAILED DESCRIPTION OF THE INVENTION

In order to overcome the problems of the prior art, the present invention sets forth an articulated glue applicator conveyor, which automatically applies glue to wood segments and positions the segments for easy placement into an automatic clamp carrier and tightener to form panels of wood.

The invention comprises a stationary conveyor, an articulated conveyor, a clamp tightener, and a control system. The stationary conveyor, which is driven by an electric motor, applies glue to segments of wood which are placed on the conveyor in a position best suited for loading into the automated clamps. This is accommodated through sensors which automatically index the loaded segments of wood.

The wood segments are subsequently conveyed onto an articulated conveyor section, which is also powered by the electric motor via a socket and tongue mechanism that allows for the facile engagement with the conveyor. The articulated section delivers the glued wood segments to positions directly corresponding to the position of the automated clamps, where they may be manually loaded onto the clamp carriers. Once loaded onto the clamp carrier, the segments are automatically tightened and flattened via an automated tightener and flattener device like those shown in U.S. Pat. Nos. 3,771,779, 4,624,451 and 5,006,193, and formed into panels.

The articulated conveyor section allows for the rotation of the clamp carrier by moving transversely to the path of the stationary conveyor section. The transverse motion of the articulated section is accomplished by means of a chain system and sprockets. This allows the clamp carrier to hold multiple panels of wood, thus providing a far greater output than previous inventions.

Figure 8:
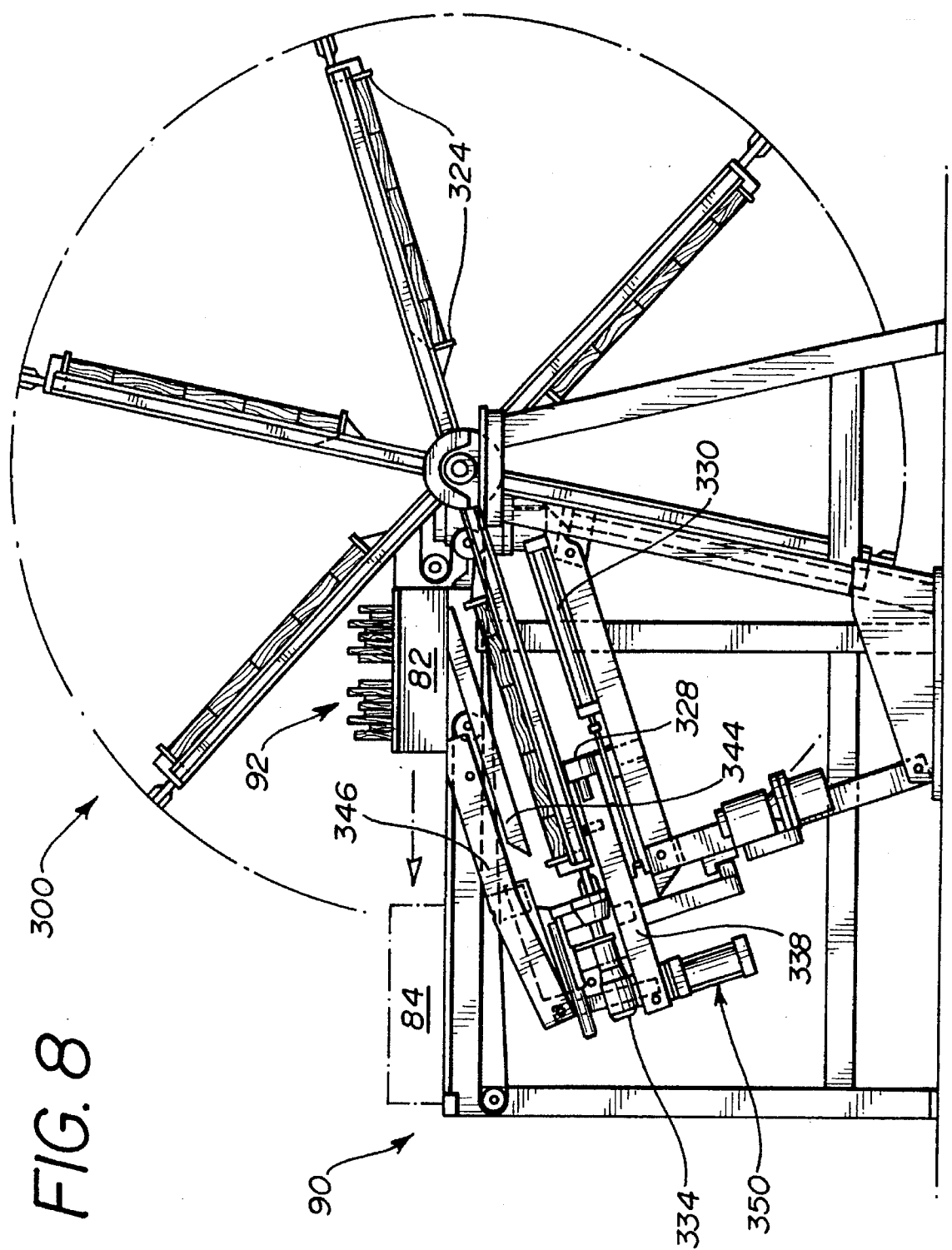
FIG. 8 is an elevational end view of the articulated conveyor and the automated clamp tightener of the present invention.

As shown in FIGS. 1–9, in particular FIG. 8, an automated clamp carrier, generally indicated at 300, is shown having a conveyor system, generally indicated at 90, with integral gluing means. The automated clamp carrier system works in much the same manner as shown in U.S. Pat. Nos. 3,771, 779, 4,624,451, and 5,006,193.

As shown in detail in FIGS. 1–9, the conveying means comprises a conveyor mounted approximately five and one half feet off the floor having two sections, a stationary section 100 and an articulated section 200, which is capable of moving perpendicular to the conveying path of the stationary conveyor section 100. The stationary conveyor comprises side rails 112, 113 and end rails 114, 115 which are supported by legs 118, 119. The conveyor 90 system is driven by an electric motor 162 which drives chain 166, which in turn drives drive sprocket 168. Drive sprocket 168 is interconnected with driven sprocket 130 through chain 121. Sprockets 170 and 172 are driven by electric motor 162 through drive sprocket 164, and drive sprocket 168, by means of chain 166.

Figure 1:
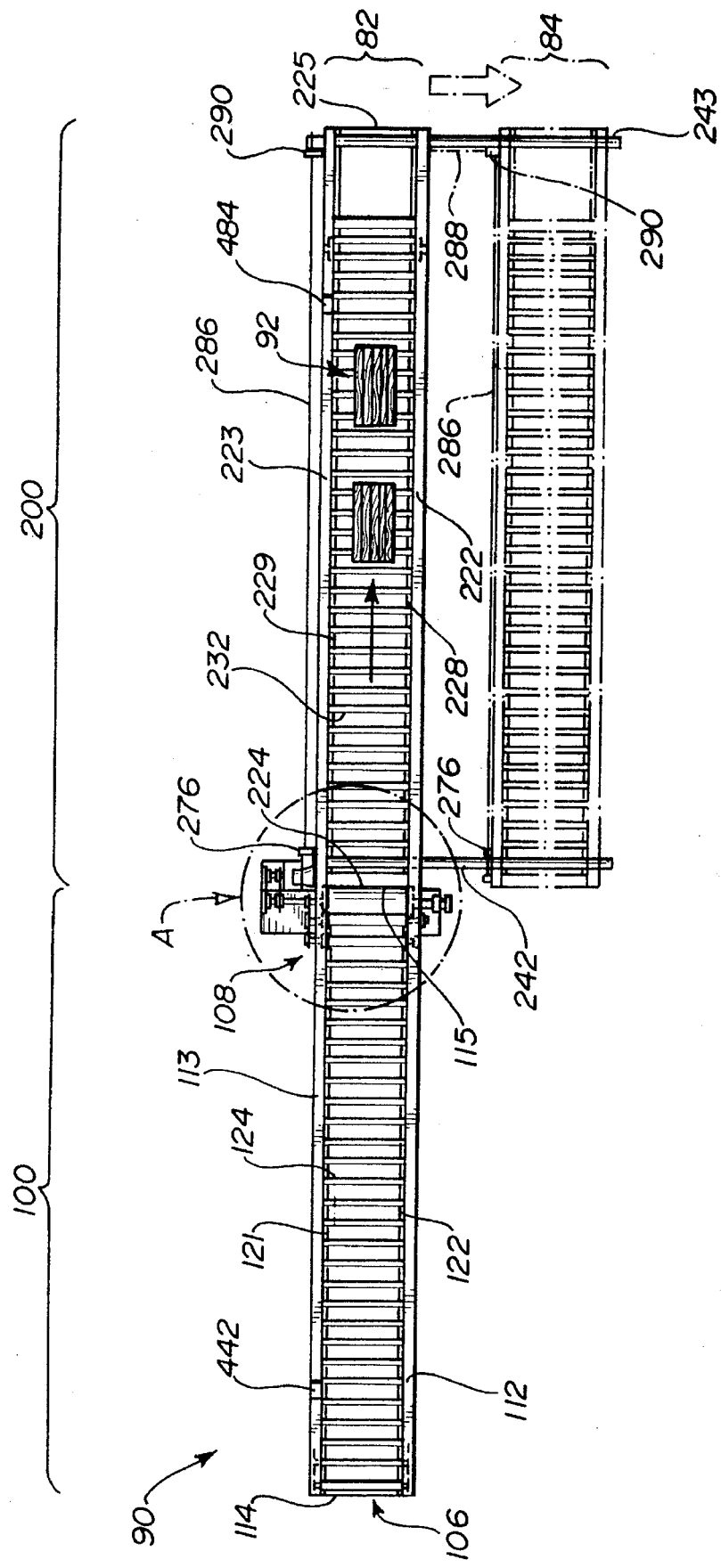
FIG. 1 is a top plan view of the stationery and articulated conveyor sections, including the various positions of the articulated conveyor section of the present invention.

The conveying means, as shown in FIG. 1, comprises angle flights or cross bars 124 welded or otherwise connected to chains 121, 122. Thus, the conveyor means is driven by drive sprockets 168, 169, so that rotation of the drive sprockets moves axle 132 to move the flights 124 from the entry end 106 of the conveyor to the power end 108 of the stationary conveyor section 100.

Figure 2:
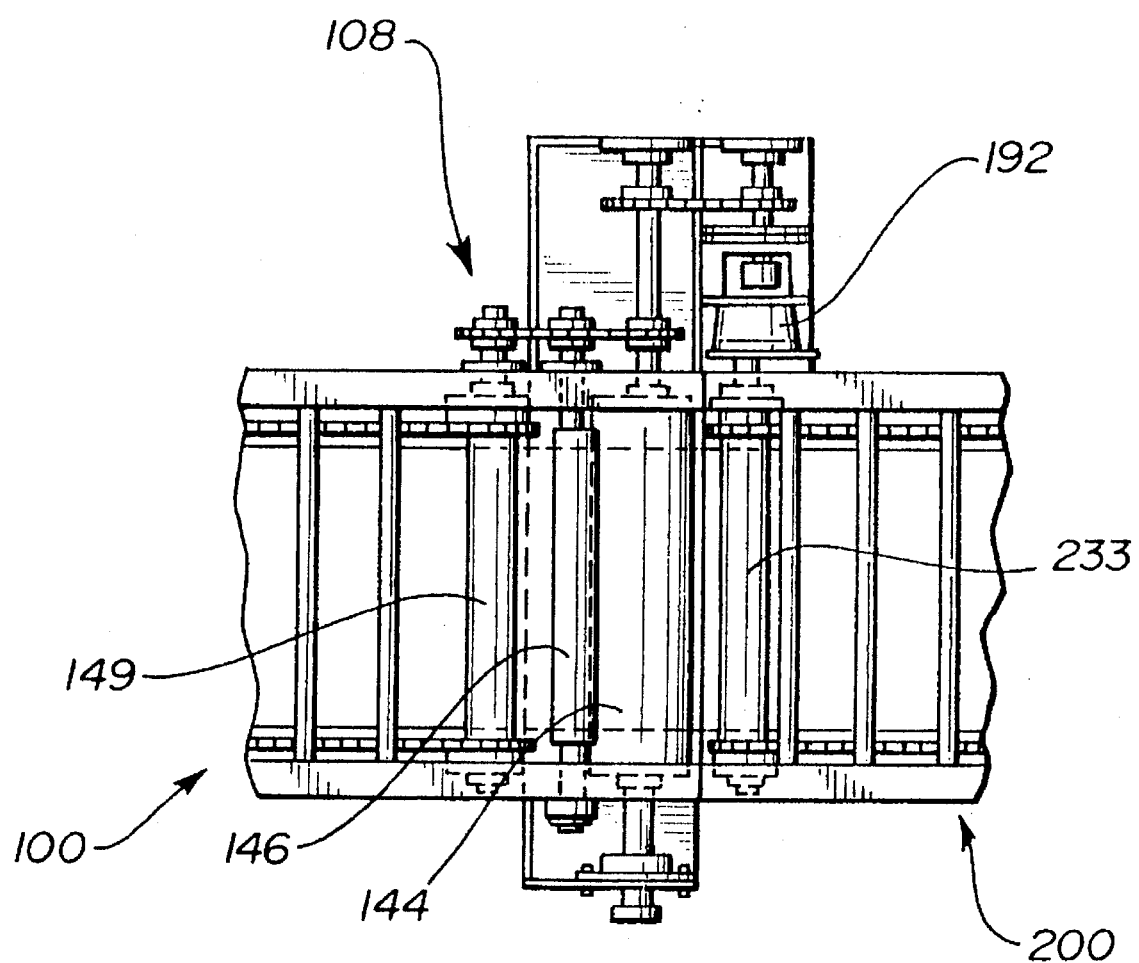
FIG. 2 is a detailed top plan view of the gluing assembly of the stationery conveyor section at circle A in FIG. 1.
Figure 3:
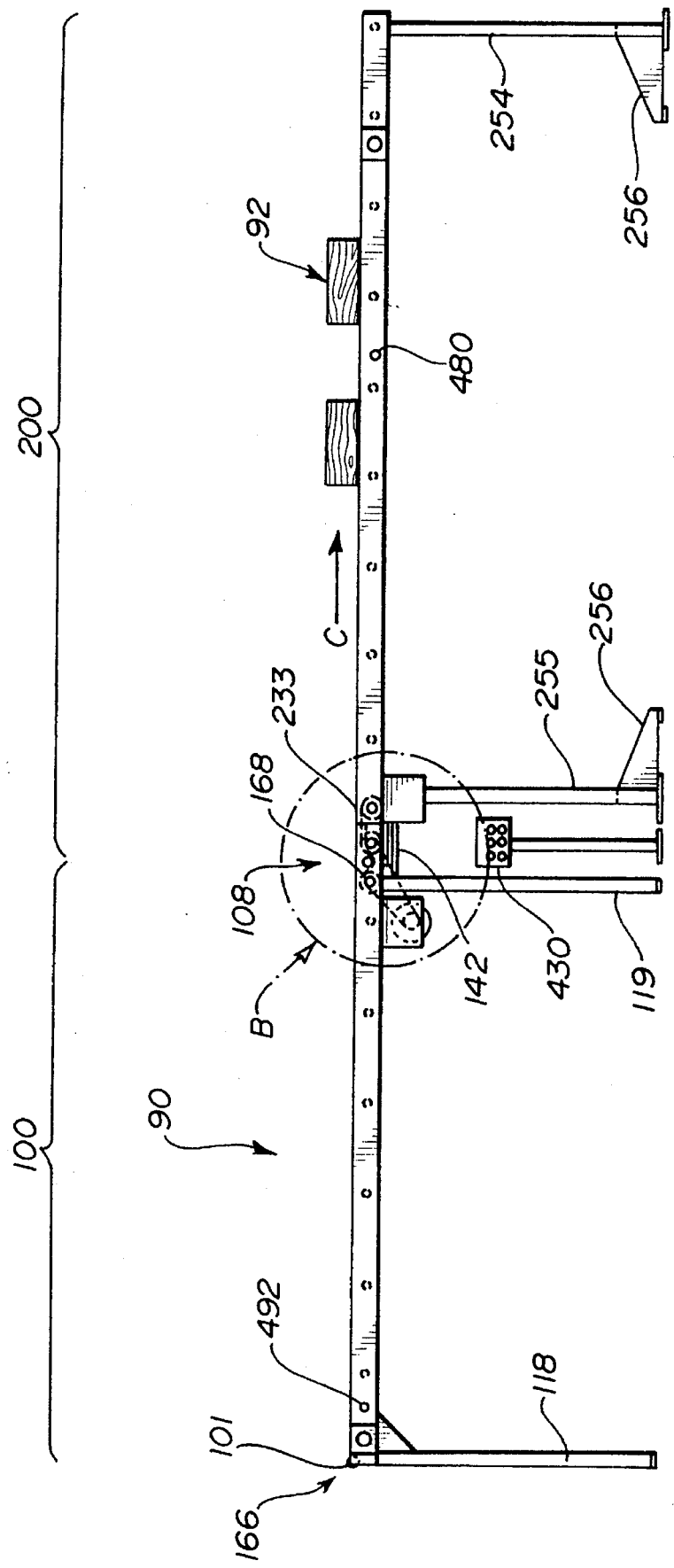
FIG. 3 is a side plan view of the articulated conveyor shown in FIG. 1, which shows the material flow on both conveyor sections.
Figure 4:
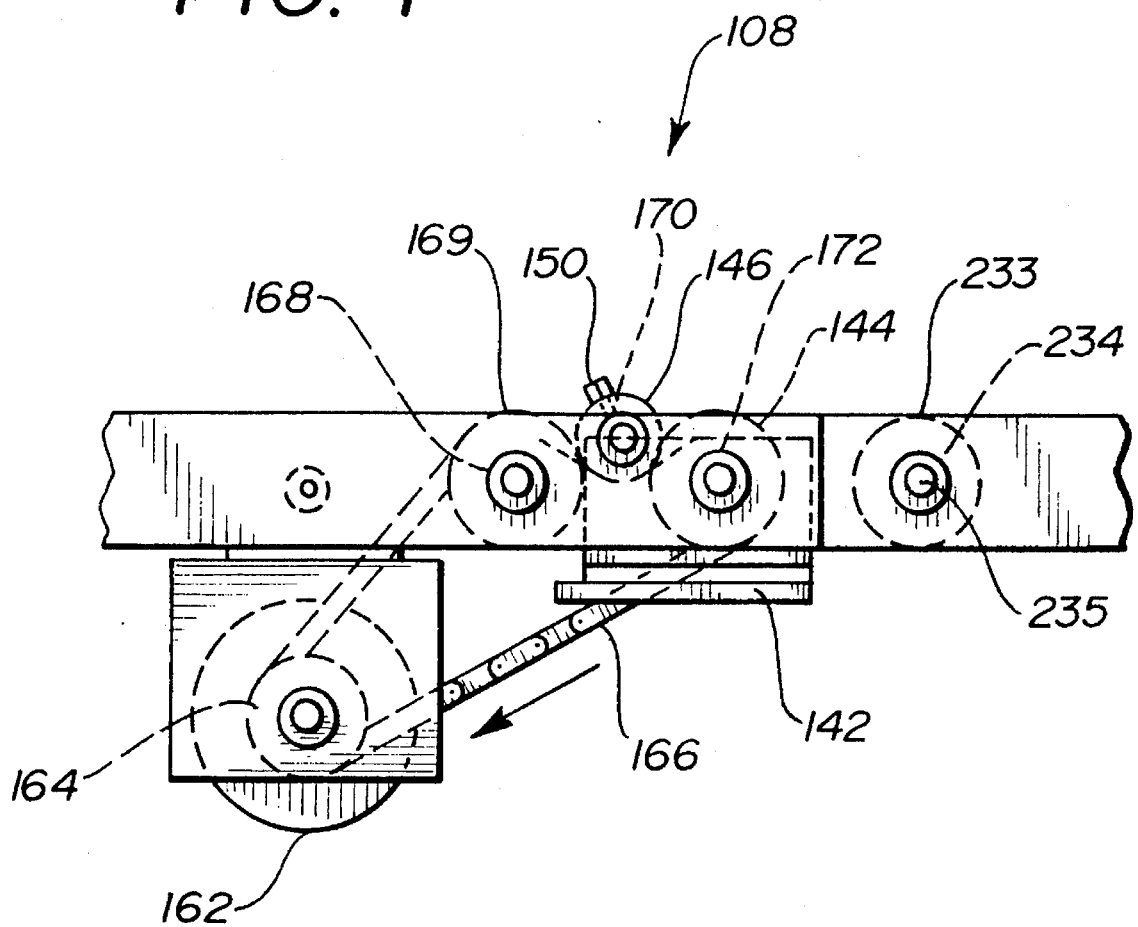
FIG. 4 is a detailed side plan view of the gluing assembly and the coupling of the drive system at circle B in FIG. 3.
Figure 5:
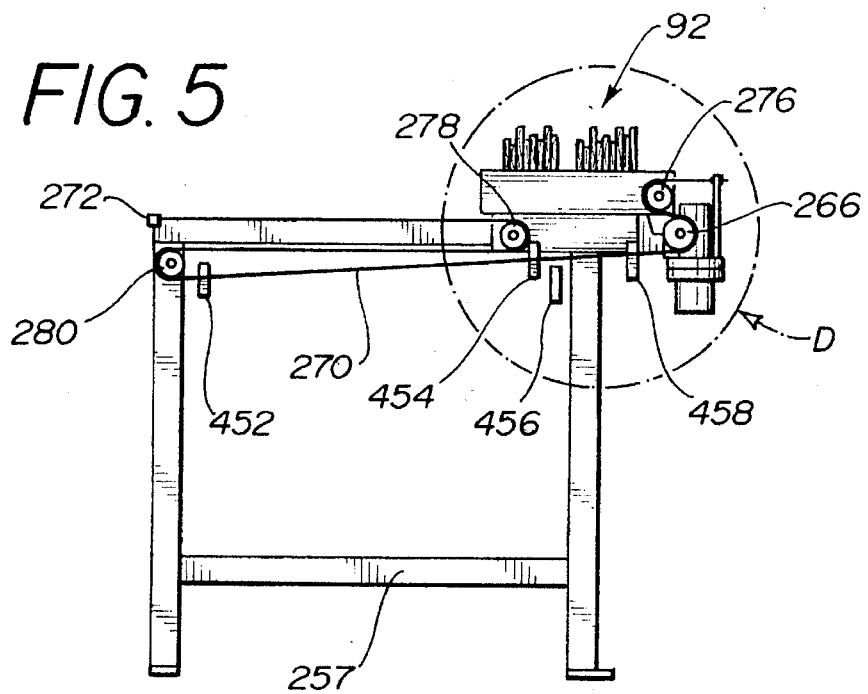
FIG. 5 is a front plan view of the support and chain assembly of the articulated conveyor section.
Figure 6:
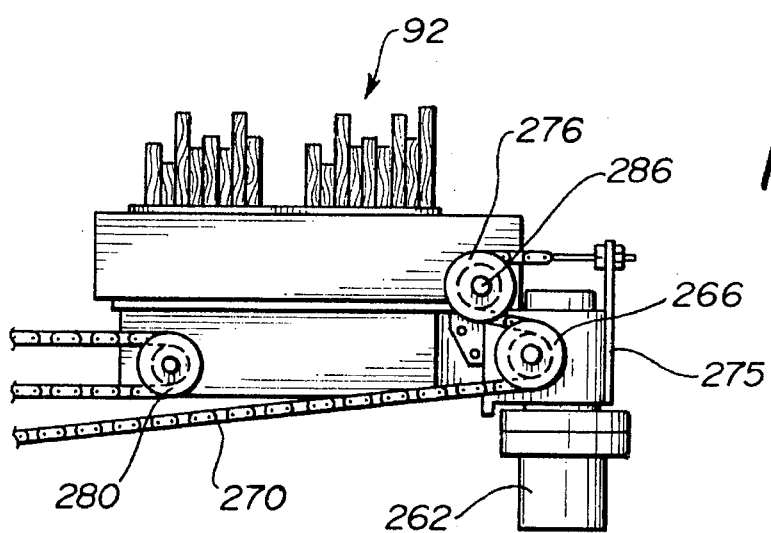
FIG. 6 is a detailed front view of the chain system at circle D in FIG. 5.
Figure 7:
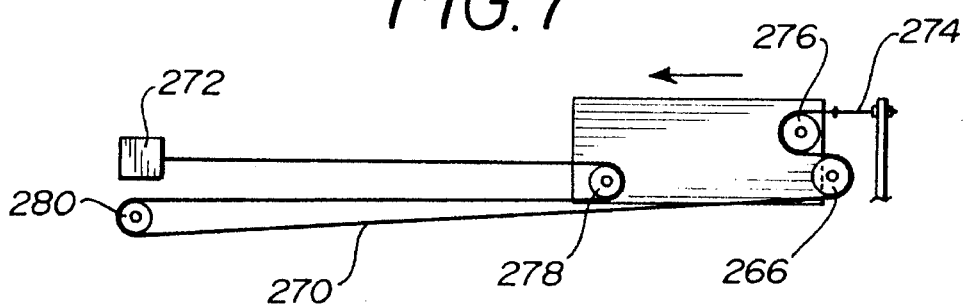
FIG. 7 is a front view of the chain system shown in FIG. 5.

As shown in FIGS. 2, 3 and 4, at the end of the stationary conveyor 100 is a gluing assembly, comprising glue pan 142, support rod 143, glue roller 144, and doctor roller 146, driven by chain 166, to which doctor sprocket 170 and glue sprocket 172 are connected. The gluing assembly can be adjusted by means of thumb screws 150. Wood segments 92 that are placed at the entry end 106 on infeed roller 101 of the conveyor are drawn by the conveyor when controlled to do so, across the glue roller 144 which sits in the glue pan 142. The roller 144 is bathed with glue so that the glue is applied to the bottom of the individual wood segments. The flow of the wood segments 92 is along arrow C in FIG. 3.

Again referring to FIGS. 1, 3 and 9, the articulated conveyor section, generally indicated at 200, comprises side rails 222, 223 and end rails 224, 225, which form the box of the conveyor. This box is supported by leg assemblies 254 and 255, which leg assemblies are reinforced by stanchions 256 and horizontal supports 257, as well as supports extending between the stationary conveyor legs and the articulated conveyor legs. The articulated section drive sprockets 234, 235, 236, and 237 are interconnected with chains 228, 229 which also support angled flights 232 which are attached in the same manner as the stationary conveyor section. When power is provided to the drive axle 233 and therefore drive sprockets 234 and 235 of the articulated conveyor, the conveyor moves the flights in the conveying path between the side rails. The articulated section 200 can move from a first position 82 in line with the stationary section 100 perpendicularly to a second position 84.

As shown in FIGS. 1, 3, 5, 6 and 7, the articulated conveyor section has the ability to move transversely from the conveying path along guide rails 242 and 243 which are supported by leg assemblies 254 and 255. The end rails of the articulated conveyor 200 are connected to the guide rails 242 and 243 by means of plastic slide bearings.

The articulated conveyor 200 is moved transversely by an air motor 262 fixed to the stationary conveyor section 100. The air motor is interconnected with a speed reducer 275 which drives an output drive sprocket 266 that meshes with a chain 270 fixed at both of its ends 272 and 274. The chain 270, extends between driven sprockets 276 and 280 on the end rail of the articulated conveyor section 200 by way of an intermediate idler sprocket 280. Rotation of the output drive sprocket 266 in a counterclockwise direction causes the driven sprocket 278 on the front of the conveyor section to draw the conveyor outward whereas the movement of the output drive sprocket 266 in the opposite, clockwise, direction causes the rear sprocket 276 to draw the articulated conveyor back to alignment with the stationary conveyor section.

The rear driven sprocket 276 of the articulated conveyor section 200 has a tie shaft 286, extending to a sprocket 290 at the remote or the final downstream end of the conveyor 200. This sprocket 290 coacts with fixed chain 288, mounted on the stationary end rail 243, so that the forces acting on the extreme ends of the articulated conveyor segment are equal and the conveyor 200 always maintains its position with respect to the perpendicular to the path of the conveyor.

Both the stationary and the articulated conveyor sections 100 and 200 are driven by the electric motor 162 mounted under the stationary conveyor section 100. Motor 162 also drives the doctor roller 146 and the glue roller 144 as well as the stationary conveyor drive and driven sprockets 168 and 130 and an articulated conveyor drive coupling as hereinafter described.

The conveyor coupling means is driven by the electric motor 162 and comprises socket 190 which is driven by a chain 186, connected from a drive sprocket 184, which is coupled by a shaft 182 extending from the driven sprocket 172 for the glue roller 144 which, as previously mentioned, is connected by chain 166 to the drive sprocket 168 of the stationary section. The socket 190 is adapted to mate with a protruding tongue 192 extending from the drive sprocket 234 of drive axle 233 of the articulated conveyor section.

Figure 9:
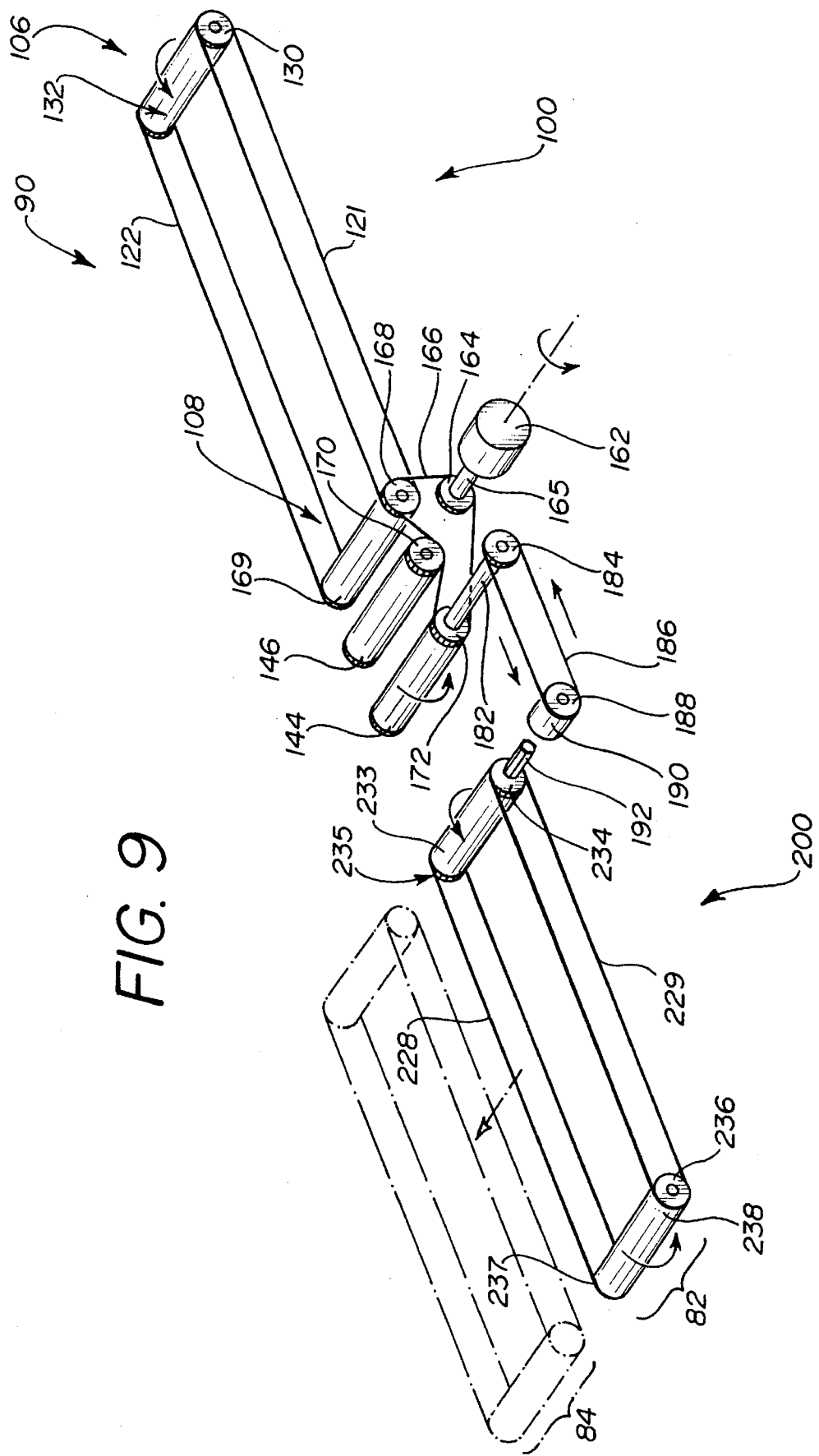
FIG. 9 is a perspective view of the longitudinal drive system of the articulated conveyor of the present invention.

Therefore, as shown in FIGS. 1 and 2 and schematically in FIG. 9, when the articulated portion 200 of the conveyor is in its rear most position in alignment with the stationary portion 100 of the conveyor and the gluing means, the socket 190 and tongue 192 are engaged so that power from the electric motor 162 is transmitted by means of the drive sprocket 164 from the electric motor 162 through the chain 166 that it meshes with. The chain 166 also meshes with the sprocket for the glue roller 172, which by means of a common axle 182 drives the drive sprocket 184 through a second chain 186 to the driven sprocket 188 of the socket 190 in the coupling for driving the articulated conveyor 200. The tongue 192 of the driven axle 233 of the articulated conveyor 200 is then rotated to rotate the driven axle 238 and driven sprockets 236 and 237 to cause the chains 228 and 229 and flights on the articulated conveyor to move.

When the articulated conveyor 200 is moved out of registration with the stationary conveyor 100, the air motor 262 drives the sprockets 266, 276, 278, and 280 which tensions the chain 270 to bring the articulated conveyor 200 outward from the stationary conveyor 100. The control means described below controls the sequencing of this occurrence. Once the articulated conveyor is moved out of registration, the socket 190 and tongue 192 are disengaged, and further movement of the flights on the articulated conveyor is halted. The articulated conveyor moves out of registration with the stationary conveyor at each cycle that requires movement of a rank of clamps down to the operating position.

In the operating position, the clamps rest on a front rest bar, and the automated tightener and flattener moves from left to right and loosens the clamps to enable removal of any glued panels which are in the clamps. Then, after the panels are removed, the operator places glued segments of wood in the now opened clamps. After the wood is placed in the clamps they are automatically tightened and form the glued segments into unitary panels of wood.

As discussed in U.S. Pat. Nos. 3,771,779, 4,624,451, and 5,006,193 incorporated by reference, sensors mounted on the tightener and flattener carriage 334 coact with the clamps 324 to locate the clamps, and, depending upon whether the cycle is to loosen or tighten the clamps, to engage the tightening/loosening wrench to open/close the clamps. When the clamps swing down to the point that they are resting on the front bar 328, control means and sensing means which sense the position of the clamps on the front bar actuate the air motor 262 to draw the articulated conveyor 200 back into alignment with the stationary conveyor section 100 so that the operator can then move into a position close to the clamps. With the articulated conveyor section 100 directly in front of the operator, and the glued wood positioned directly above the clamping sections so that the operator need only lift his or her hand to take the sections of the glued wood and stack them in the opened clamps. After all of the clamps have been filled with glued segments of wood, the tightener sequence starts and the automated tightener and flattener 334 sequentially moves from right to left flattening the individual loose segments of wood and then tightening the clamps 324 for each section or group of clamps to form an individual panel.

As can be seen in FIG. 8, the tightener and flattener carriage has been modified from that shown in the previous patents in that the air cylinders 350 used to actuate the flattener have been positioned below the tighteners and flattener and they are now actuated by means of a rocker arm 346 upon extension of the air cylinders to force the flattener bars 344 downward to flatten the individual segments of wood and hold them as the clamps are tightened. When the air pressure is released, the rocker arms are biased to keep the flattener bars 344 in the upper position to allow the carriage to move to the next clamp that is sensed. The sensors are electronic in nature and can be any type such as magnetic or visual sensors, both of which deal with the proximity of the sensing element to an electronic detector whether it be an electric eye or a magnetic sensor.

When the entire clamping sequence has been completed, the front bar 328 moves forward by means of cylinder 330 to allow the rank of clamps to rotate downward and at the same time to bring the next rank of clamps with glued panels down, ready for the bar to be moved back into the working position to support the clamps as they are loosened. Once the clamps are loosened the panels are removed from them, new wood segments are placed on them and the segments then flattened and the clamps tightened automatically. As mentioned, the articulated conveyor 200 must be moved perpendicular to and outward from the clamps when the clamp ranks are brought downward to the working station. The articulated conveyor need not be brought out when the front bar is moved outward since the conveyor is above the front bar. In the sequencing of movements, the movement of the front bar is coordinated with movement of the clamp ranks, and the two occur simultaneously with the movement of the conveyor perpendicular to the movement to the path of conveying.

Sensors and flags are interconnected with the air motor and electric motor by way of the controller for controlling the starting and stopping of the air motor and electric motor. The conveyor 200 is controlled by means of two sensors 452, 456 with corresponding flags 454, 458 on the outboard and inboard of the articulated conveyor mechanism. The outboard flag 454 indicates when the conveyor is fully extended to its outer position and then stops the supply of air to the air motor 262 that has driven the conveyor outward. The inboard flag 458 is connected via the controller not only to the air motor to shut the air motor when the conveyor has reached the back section, but the inboard flag 458 via the controller also actuates the electric motor 162 to drive the socket 190 for the power coupling to the articulated conveyor as previously described. The inboard flag 458 starts the socket 190 rotating at a short time before contact is made between the tongue 192 and the socket 190.

The control system also provides several different means by which the wood segments are automatically transported to the individual clamping stations so that they can be loaded by the operator after they have been automatically glued. A sensing element is provided at the upstream end of the stationary conveyor which causes the conveyor to advance as long as a sensing means, in this case an electric eye beam 442, is broken by the presence of wood segments that have been loaded at this end of the conveyor. This electric eye or sensing means causes the conveyor to advance a predetermined distance, typically the distance between clamping stations. Therefore, by sequentially loading groups of wood segments on the end of the stationary conveyor, each group is automatically spaced on the conveyor the required distance necessary to align these groups of wood segments with the clamping groups in each rack of the clamps.

When the desired amount of wood segments are placed on the stationary conveyor, the operator presses a ready button 492 located on the front rail of the stationary conveyor which enables operation of the conveyor system and coordination of the conveyor system with the automatic tightener and flattener and clamp positioning. With the system enabled, the articulated conveyor moves outward and a rank of clamps moves downward into position to rest on the rest bar 328 of the automated tightener and flattener. The articulated conveyor will then move back to the position in registration with the stationary conveyor. The conveyor is then actuated and the wood segments are drawn over the glue roller onto the articulated portion of the conveyor. The wood segments pass downstream until reaching the most downstream location of the clamps whereupon the glued wood segments will be detected by sensing means which in this case is an electric eye, and the conveyors will stop. An adjusting button 480 is positioned on the front of the articulated conveyor to allow the operator to manually move individual bundles to the proper location if such is necessary in order for the bundles to be most beneficially positioned with relation to the clamps.

The carriage of the automated clamp tightener and flattener then goes through its loosening cycle and stops at each of the clamps and loosens the clamps until all of the clamps in a particular rank of clamps have been loosened. The operator then manually picks up the wood panels from each group of clamps and places them on an output skid. He or she then removes the wood segments from the articulated conveyor directly above each clamping station and loads the clamps with the wood segments. Next he or she moves down each group of clamps and does the same until all of the clamps in this rank have been loaded. He or she then walks to the control panel 490 and hits the start button, and the automated tightener and flattener then proceeds along the front of the machine to tighten the clamps.

Modifications of the foregoing may be made without departing from the spirit and scope of the invention. What is desired to be protected by Letters Patents is set forth in the appended claims.

APPENDIX A

```
* #80P- AUTOMATED CLAMP CARRIER
* Includes control for shuttling applica
    tor DEFINE SENSETIGHTENBUTTON=I:0/1
DEFINE SENSELOOSENBUTTON=I:0/2
DEFINE SENSESTOPBUTTON=I:0/3
DEFINE SENSESAFETYEYE=I:0/4
DEFINE SENSECLAMP=I:0/5
DEFINE SENSELEFTSTOP=I:0/6
DEFINE SENSERIGHTSTOP=I:0/0
DEFINE SENSEWRENCHFORWARD=I:0/7
DEFINE SENSECAMSWITCH=I:0/8
DEFINE SENSEDRIVER=I:0/9
DEFINE SENSEREVERSECARRIERROTATEBUTTON=I
    :0/10
DEFINE SENSEFORWARDCARRIERROTATEBUTTON=I
    :0/11
DEFINE SENSEGLUEAPPLIN=I:0/12
DEFINE SENSEGLUEAPPLOUT=I:0/13
DEFINE SENSESTOPWAND=I:0/14
DEFINE REVERSECARRIERROTATION=O:0/0
DEFINE FORWARDCARRIERROTATION=O:0/1
DEFINE WRENCHCCW=O:0/2
DEFINE WRENCHCW=O:0/3
DEFINE WRENCHFORWARD=O:0/4
DEFINE GLUEAPPLRUN=O:0/5
DEFINE GLUEAPPLIN=O:0/6
DEFINE GLUEAPPLOUT=O:0/7
DEFINE LEFTTRAVERSE=O:0/8
DEFINE RIGHTTRAVERSE=O:0/9
DEFINE EXTRAOUTPUT=O:0/10
DEFINE FLATTENERDOWN=O:0/11
DEFINE SAFETYBEAMISENABLED=B3/0
DEFINE ACCNOTREADY=B3/1
DEFINE OPERATORREADY=B3/2
DEFINE LASTBUTTONSTATE=B3/3
DEFINE GAPEADYBUTTON=B3/4
DEFINE POWERRESTORED=S2:1/15
DEFINE TIMER0=T4:0
DEFINE TIMER1=T4:1
DEFINE TIMER2=T4:2
DEFINE TIMER3=T4:3
DEFINE TIMER4=T4:4
DEFINE TIMER5=T4:5
DEFINE TIMER6=T4:6
DEFINE TIMER7=T4:7
DEFINE TIMER8=T4:8
DEFINE TIMER9=T4:9
DEFINE TIMER10=T4:10
DEFINE TIMER11=T4:11
DEFINE TIMER12=T4:12
DEFINE TIMER13=T4:13
DEFINE TIMER14=T4:14
DEFINE TIMER15=T4:15
DEFINE TIMER16=T4:16
DEFINE TIMER17=T4:17
DEFINE TIMER18=T4:18
DEFINE TIMER19=T4:19
DEFINE TIMER20=T4:20
DEFINE COUNTER0=C5:0
DEFINE COUNTER1=C5:1
DEFINE COUNTER2=C5:2
DEFINE COUNTER3=C5:3
```

```
DEFINE COUNTER4=C5:4
DEFINE COUNTER5=C5:5
DEFINE COUNTER6=C5:6

GOTO STOPMACHINE WHENEVER NOT SENSESTOPB
    UTTON OR S2:1/15 OR (SENSESAFETYEYE
    AND SAFETYBEAMISENABLED)
NI:0/3 OR IS2:1/15 OR ( II:0/4 IB3/0 ) LB3/38
                                                0

HOLD FLATTENERDOWN WHENEVER WRENCHCW AND
    SAFETYBEAMISENABLED                            O:0/3     B3/0        O:0/11
                                                1  ---| |------| |------( )---

TIGHTEN;
    * MOVE TO THE RIGHT, TIGHTENING EACH
    CLAMP UNLESS THE TIGHTEN BUTTON IS
    * HELD DOWN
    LATCH SAFETYBEAMISENABLED                      B3/10     B3/0
                                                2  ---| |------(L)---
    LATCH ACCNOTREADY                              B3/10     B3/1
                                                3  ---| |------(L)---
    LATCH RIGHTTRAVERSE                            B3/10     O:0/9
                                                4  ---| |------(L)---
    RESET COUNTER0 TO 0     *** TRIES COUNT
        ER ***                                     B3/10     C5:0
                                                5  ---| |------(RST)--
                                                              0

TIMER TIMER0 TO .3                             B3/10     T4:0
                                                6  ---| |------(TON)--
                                                              .3

GOTO NEXT IF TIMER0 AND NOT SENSECLAM
        P                                          B3/10     T4:0       I:0/5      B3/11
                                                7  ---| |------| |------|/|------(L)---
                                                   B3/11     B3/10
                                                8  ---| |------(U)---
    GOTO ROTATECARRIER IF SENSERIGHTSTOP            B3/10     I:0/0      B3/22
                                                9  ---| |------| |------(L)---
                                                   B3/22     B3/10
                                                10 ---| |------(U)---

; * TRAVERSE UNTIL SENSE CLAMP. SKIP
    CLAMP IF BUTTON IS HELD DOWN
GOTO NEXT IF SENSECLAMP AND NOT SENSE
    TIGHTENBUTTON                                  B3/11     I:0/5      I:0/1      B3/12
                                                11 ---| |------| |------|/|------(L)---
                                                   B3/12     B3/11
                                                12 ---| |------(U)---
GOTO ROTATECARRIER IF SENSERIGHTSTOP               B3/11     I:0/0      B3/22
                                                13 ---| |------| |------(L)---
                                                   B3/22     B3/11
                                                14 ---| |------(U)---

TIGHTENCLAMP;
    UNLATCH RIGHTTRAVERSE                          B3/12     O:0/9
                                                15 ---| |------(U)---
    UNLATCH WRENCHCCW                              B3/12     O:0/2
                                                16 ---| |------(U)---
    TIMER TIMER1 TO .2                             B3/12     T4:1
                                                17 ---| |------(TON)--
                                                              .2
```

```
LATCH WRENCHCW                                      B3/12      O:0/3
                                              18    ---| |------(L)---
LATCH WRENCHFORWARD IF TIMER1                       B3/12      T4:1      O:0/4
                                              19    ---| |------| |------(L)---
RESET COUNTER1 TO 0                                 B3/12      C5:1
                                              20    ---| |-----(RST)--
                                                                 0
RESET COUNTER2 TO 0                                 B3/12      C5:2
                                              21    ---| |-----(RST)--
                                                                 0
TIMER TIMER2 TO 1.5                                 B3/12      T4:2
                                              22    ---| |-----(TCN)--
                                                                 1.5
GOTO NEXT IF TIMER2                                 B3/12      T4:2      B3/13
                                              23    ---| |------| |------(L)---
                                                    B3/13      B3/12
                                              24    ---| |------(U)---
GOTO CONTINUETIGHTENCLAMP IF SENSEWRE
   NCHFORWARD                                       B3/12      I:0/7     B3/14
                                              25    ---| |------| |------(L)---
                                                    B3/14      B3/12
                                              26    ---| |------(U)---

; * RELAX WRENCH, WAIT 1 SECOND AND T
   RY AGAIN
UNLATCH WRENCHFORWARD                               B3/13      O:0/4
                                              27    ---| |------(U)---
UNLATCH WRENCHCW                                    B3/13      O:0/3
                                              28    ---| |------(U)---
COUNT COUNTER0 TO 5                                 B3/13      C5:0
                                              29    ---| |-----(CTU)--
                                                                 5
TIMER TIMER2 TO 1.0                                 B3/13      T4:2
                                              30    ---| |-----(TCN)--
                                                                 1.0
GOTO TIGHTENCLAMP IF TIMER2                         B3/13      T4:2      B3/12
                                              31    ---| |------| |------(L)---
                                                    B3/12      B3/13
                                              32    ---| |------(U)---
GOTO STOPMACHINE IF COUNTER0                        B3/13      C5:0      B3/38
                                              33    ---| |------| |------(L)---
                                                    B3/38      B3/13
                                              34    ---| |------(U)---

CONTINUETIGHTENCLAMP; * FLIP FLOP BETWEE
   N STATES UNTIL DRIVER STALLS
TIMER TIMER3 TO .5                                  B3/14      T4:3
                                              35    ---| |-----(TCN)--
                                                                 .5
COUNT COUNTER1 TO 4                                 B3/14      C5:1
                                              36    ---| |-----(CTU)--
                                                                 4
GOTO NEXT IF SENSEDRIVER                            B3/14      I:0/9     B3/15
                                              37    ---| |------| |------(L)---
                                                    B3/15      B3/14
                                              38    ---| |------(U)---
GOTO STALLED IF TIMER3                              B3/14      T4:3      B3/16
                                              39    ---| |------| |------(L)---
                                                    B3/16      B3/14
                                              40    ---| |------(U)---
GOTO SCREWPROTRUSION IF NOT SENSEWREN
```

```
        CHFORWARD AND COUNTER1                    B3/14    I:0/7    C5:1            B3/17
                                             41 ---| |------|/|------| |------(L)---
                                                   B3/17    B3/14
                                             42 ---| |------(U)---

;
     TIMER TIMER4 TO .5
                                                   B3/15    T4:4
                                             43 ---| |-----(TCN)--
                                                                .5

GOTO CONTINUETIGHTENCLAMP IF NOT SENS
        EDRIVER                                    B3/15    I:0/9    B3/14
                                             44 ---| |------|/|------(L)---
                                                   B3/14    B3/15
                                             45 ---| |------(U)---
                                                   B3/15    T4:4     B3/16
     GOTO NEXT IF TIMER4                     46 ---| |------| |------(L)---
                                                   B3/16    B3/15
                                             47 ---| |------(U)---

STALLED;
        UNLATCH WRENCHCW                           B3/16    O:0/3
                                             48 ---| |------(U)---
                                                   B3/16    O:0/4
        UNLATCH WRENCHFORWARD                49 ---| |------(U)---

TIMER TIMER5 TO .1 IF NOT SENSEWRENCH
           FORWARD
                                                   B3/16    I:0/7    T4:5
                                             50 ---| |------|/|-----(TCN)--
                                                                          .1

B3/16    T4:5     B3/10
        GOTO TIGHTEN IF TIMER5               51 ---| |------| |------(L)---
                                                   B3/10    B3/16
                                             52 ---| |------(U)---

SCREWPROTRUSION;
        UNLATCH WRENCHCW                           B3/17    O:0/3
                                             53 ---| |------(U)---
                                                   B3/17    O:0/2
        LATCH WRENCHCCW                      54 ---| |------(L)---
                                                   B3/17    I:0/7    B3/18
        GOTO NEXT IF SENSEWRENCHFORWARD      55 ---| |------| |------(L)---
                                                   B3/18    B3/17
                                             56 ---| |------(U)---

;
     COUNT COUNTER2 TO 22 IF SENSEDRIVER          B3/18    I:0/9    C5:2
                                             57 ---| |------| |-----(CTU)--
                                                                          22
                                                   B3/18    C5:2     B3/19
     GOTO NEXT IF COUNTER2                   58 ---| |------| |------(L)---
                                                   B3/19    B3/18
                                             59 ---| |------(U)---

GOTO TIGHTENCLAMP IF NOT SENSEWRENCHF
        ORWARD                                     B3/18    I:0/7    B3/12
                                             60 ---| |------|/|------(L)---
                                                   B3/12    B3/18
                                             61 ---| |------(U)---

PROTRUSION2;
        UNLATCH SAFETYBEAMISENABLED                B3/19    B3/0
                                             62 ---| |------(U)---
                                                   B3/19    O:0/4
        UNLATCH WRENCHFORWARD                63 ---| |------(U)---
```

```
UNLATCH WRENCHCCW                                       B3/19     O:0/2
                                                    64  ---| |------(U)---
TIMER TIMER6 TO .3 IF NOT SENSEWRENCH
  FORWARD
                                                        B3/19     I:0/7    T4:6
                                                    65  ---| |------|/|-----(TON)--
                                                                              .3
GOTO NEXT IF TIMER6                                     B3/19     T4:6     B3/20
                                                    66  ---| |------| |------(L)---
                                                        B3/20     B3/19
                                                    67  ---| |------(U)---

; * GET PASSED CLAMP
LATCH LEFTTRAVERSE                                      B3/20     O:0/8
                                                    68  ---| |------(L)---
TIMER TIMER7 TO .5
                                                        B3/20     T4:7
                                                    69  ---| |-----(TON)--
                                                                      .5
GOTO NEXT IF TIMER7 AND (SENSELEFTSTO
  P OR SENSECLAMP)
IB3/20 IT4:7 ( II:0/6 OR II:0/5 ) LB3/21
                                                        B3/21     B3/20
                                                    70  ---| |------(U)---

; * WAIT FOR START BUTTON
UNLATCH LEFTTRAVERSE                                    B3/21     O:0/8
                                                    71  ---| |------(U)---
GOTO TIGHTEN IF SENSETIGHTENBUTTON                      B3/21     I:0/1    B3/10
                                                    72  ---| |------| |------(L)---
                                                        B3/10     B3/21
                                                    73  ---| |------(U)---

ROTATECARRIER:
  LATCH GAOUT                                           B3/22     B3/41
                                                    74  ---| |------(L)---
  UNLATCH RIGHTTRAVERSE                                 B3/22     O:0/9
                                                    75  ---| |------(U)---
  LATCH REVERSECARRIERROTATION                          B3/22     O:0/0
                                                    76  ---| |------(L)---
  TIMER TIMER8 TO .3
                                                        B3/22     T4:8
                                                    77  ---| |-----(TON)--
                                                                      .3
  GOTO NEXT IF TIMER8                                   B3/22     T4:8     B3/23
                                                    78  ---| |------| |------(L)---
                                                        B3/23     B3/22
                                                    79  ---| |------(U)---

; * WAIT FOR FRONT REST TO COME OUT
UNLATCH REVERSECARRIERROTATION                          B3/23     O:0/0
                                                    80  ---| |------(U)---
TIMER TIMER9 TO 2.2
                                                        B3/23     T4:9
                                                    81  ---| |-----(TON)--
                                                                     2.2
GOTO NEXT IF TIMER9                                     B3/23     T4:9     B3/24
                                                    82  ---| |------| |------(L)---
                                                        B3/24     B3/23
                                                    83  ---| |------(U)---

; * ROTATE FORWARD 1 SECOND BEFORE SE
  NSING FOR CAM
LATCH FORWARDCARRIERROTATION                            B3/24     O:0/1
```

```
                                           84  ---| |------(L)---
    TIMER TIMER10 TO 1.5
                                                B3/24    T4:10
                                           85  ---| |------(TCN)--
                                                           1.5
    GOTO NEXT IF TIMER10 AND SENSECAMSWIT
         CH
                                                B3/24    T4:10    I:0/8    B3/25
                                           86  ---| |------| |------| |------(L)---
                                                B3/25    B3/24
                                           87  ---| |------(U)---

PULSE; * PULSE AIR MOTOR DRIVE UNTIL CAM
          SWITCH TURNS OFF
                                                B3/25    B3/42
          LATCH GAIN
                                           88  ---| |------(L)---
                                                B3/25    O:0/1
          UNLATCH FORWARDCARRIERROTATION
                                           89  ---| |------(U)---

TIMER TIMER11 TO .2
                                                B3/25    T4:11
                                           90  ---| |-----(TCN)--
                                                           .2
          GOTO NEXT IF TIMER11                  B3/25    T4:11    B3/26
                                           91  ---| |------| |------(L)---
                                                B3/26    B3/25
                                           92  ---| |------(U)---
          GOTO LOOSEN IF NOT SENSECAMSWITCH     B3/25    I:0/8    B3/27
                                           93  ---| |------|/|------(L)---
                                                B3/27    B3/25
                                           94  ---| |------(U)---

;
          LATCH FORWARDCARRIERROTATION          B3/26    O:0/1
                                           95  ---| |------(L)---

TIMER TIMER12 TO .1
                                                B3/26    T4:12
                                           96  ---| |------(TCN)--
                                                           .1
          GOTO NEXT IF NOT SENSECAMSWITCH       B3/26    I:0/8    B3/27
                                           97  ---| |------|/|------(L)---
                                                B3/27    B3/26
                                           98  ---| |------(U)---
          GOTO PULSE IF TIMER12                 B3/26    T4:12    B3/25
                                           99  ---| |------| |------(L)---
                                                B3/25    B3/26
                                           100 ---| |------(U)---

LOOSEN;
                                                B3/27    O:0/8
          LATCH LEFTTRAVERSE
                                           101 ---| |------(L)---
                                                B3/27    O:0/1
          UNLATCH FORWARDCARRIERROTATION
                                           102 ---| |------(U)---
                                                B3/27    B3/0
          UNLATCH SAFETYBEAMISENABLED
                                           103 ---| |------(U)---
                                                B3/27    C5:3
          RESET COUNTER3 TO 0
                                           104 ---| |------(RST)--
                                                           0
          TIMER TIMER13 TO .3
                                                B3/27    T4:13
                                           105 ---| |------(TCN)--
                                                           .3
          GOTO NEXT IF TIMER13 AND NOT SENSECLA
               MP                               B3/27    T4:13    I:0/5    B3/28
                                           106 ---| |------| |------|/|------(L)---
                                                B3/28    B3/27
```

```
                                    107 ---| |------(U)---
    GOTO WAITFORBEAM IF SENSELEFTSTOP        B3/27    I:0/6    B3/37
                                    108 ---| |------| |------(L)---
                                            B3/37    B3/27
                                    109 ---| |------(U)---

;
    GOTO NEXT IF SENSECLAMP AND NOT SENSE
        LOOSEBUTTON                         B3/28    I:0/3    I:0/2    B3/29
                                    110 ---| |------| |------|/|------(L)---
                                            B3/29    B3/28
                                    111 ---| |------(U)---
    GOTO WAITFORBEAM IF SENSELEFTSTOP        B3/29    I:0/6    B3/37
                                    112 ---| |------| |------(L)---
                                            B3/37    B3/28
                                    113 ---| |------(U)---

LOOSENCLAMP:
    RESET COUNTER4 TO 0                     B3/29    C5:4
                                    114 ---| |------(RST)--
                                                      0
    UNLATCH LEFTTRAVERSE                    B3/29    O:0/8
                                    115 ---| |------(U)---
    LATCH WRENCHCCW                         B3/29    O:0/2
                                    116 ---| |------(L)---
    LATCH WRENCHFORWARD                     B3/29    O:0/4
                                    117 ---| |------(L)---
    UNLATCH WRENCHCW                        B3/29    O:0/3
                                    118 ---| |------(U)---
    TIMER TIMER14 TO 1.5                    B3/29    T4:14
                                    119 ---| |------(TON)--
                                                     1.5
    GOTO NEXT IF TIMER14                    B3/29    T4:14    B3/30
                                    120 ---| |------| |------(L)---
                                            B3/30    B3/29
                                    121 ---| |------(U)---
    GOTO CONTINUELOOSENCLAMP IF SENSEWREN
        CHFORWARD                           B3/29    I:0/7    B3/31
                                    122 ---| |------| |------(L)---
                                            B3/31    B3/29
                                    123 ---| |------(U)---

; * RELAX WRENCH FOR 1 SECOND AND TRY
        AGAIN
    UNLATCH WRENCHFORWARD                   B3/30    O:0/4
                                    124 ---| |------(U)---
    UNLATCH WRENCHCCW                       B3/30    O:0/2
                                    125 ---| |------(U)---
    COUNT COUNTER3 TO 5                     B3/30    C5:3
                                    126 ---| |------(CTU)--
                                                      5
    TIMER TIMER15 TO 1.0                    B3/30    T4:15
                                    127 ---| |------(TON)--
                                                     1.0
    GOTO LOOSENCLAMP IF TIMER15             B3/30    T4:15    B3/29
                                    128 ---| |------| |------(L)---
                                            B3/29    B3/30
                                    129 ---| |------(U)---
    GOTO STOPMACHINE IF COUNTER3            B3/30    C5:3     B3/38
                                    130 ---| |------| |------(L)---
                                            B3/38    B3/30
                                    131 ---| |------(U)---
```

```
CONTINUELOOSENCLAMP;
    RESET COUNTER5 TO 0                                 B3/31      CS:5
                                                 132  ---| |-----(RST)--
                                                                    0
    RESET COUNTER6 TO 0                                 B3/31      CS:6
                                                 133  ---| |-----(RST)--
                                                                    0
    COUNT COUNTER4 TO 4 IF SENSEDRIVER                  B3/31    I:0/9      CS:4
                                                 134  ---| |------| |-----(CTU)--
                                                                              4
    GOTO STAMPINGSENSED IF SENSECLAMP                   B3/31    I:0/5      B3/32
                                                 135  ---| |------| |------(L)---
                                                        B3/32    B3/31
                                                 136  ---| |------(U)---

GOTO NUTBACKOFF IF NOT SENSEWRENCHFOR
    WARD                                                B3/31    I:0/7      B3/34
                                                 137  ---| |------|/|------(L)---
                                                        B3/34    B3/31
                                                 138  ---| |------(U)---
    GOTO DONELOOSENING IF COUNTER4                      B3/31    CS:4       B3/36
                                                 139  ---| |------| |------(L)---
                                                        B3/36    B3/31
                                                 140  ---| |------(U)---

STAMPINGSENSED; * LOOSEN UNTIL NOT SENSE
D, THEN 10 TURNS
    COUNT COUNTER6 TO 10 IF NOT SENSECLAM
    P                                                   B3/32    I:0/5      CS:6
                                                 141  ---| |------|/|------(CTU)--
                                                                             10
    GOTO DONELOOSENING IF COUNTER6                      B3/32    CS:6       B3/36
                                                 142  ---| |------| |------(L)---
                                                        B3/36    B3/32
                                                 143  ---| |------(U)---
    GOTO NUTBACKOFF IF NOT SENSEWRENCHFOR
    WARD                                                B3/32    I:0/7      B3/34
                                                 144  ---| |------|/|------(L)---
                                                        B3/34    B3/32
                                                 145  ---| |------(U)---
    GOTO NEXT IF NOT SENSEDRIVER                        B3/32    I:0/9      B3/33
                                                 146  ---| |------|/|------(L)---
                                                        B3/33    B3/32
                                                 147  ---| |------(U)---

;
    GOTO STAMPINGSENSED IF SENSEDRIVER                  B3/33    I:0/9      B3/32
                                                 148  ---| |------| |------(L)---
                                                        B3/32    B3/33
                                                 149  ---| |------(U)---

NUTBACKOFF; * TIGHTEN UNTIL WRENCH FORWA
RD THEN 4 TURNS OR WRENCH STALLS
    UNLATCH WRENCHCCW                                   B3/34    O:0/2
                                                 150  ---| |------(U)---
    LATCH WRENCHCW                                      B3/34    O:0/3
                                                 151  ---| |------(L)---

TIMER TIMER16 TO .4                                 B3/34    T4:16
                                                 152  ---| |------(TON)--
                                                                    .4
    COUNT COUNTER5 TO 3 IF SENSEWRENCHFOR
    WARD                                                B3/34    I:0/7      CS:5
                                                 153  ---| |------| |------(CTU)--
```

```
       GOTO LOOSENCLAMP IF TIMER16
                                                                    3
                                           B3/34    T4:16    B3/29
                                    154  ---| |------| |------(L)---
                                           B3/29    B3/34
       GOTO DONELOOSENING IF COUNTER5  155  ---| |------(U)---
                                           B3/34    C5:5     B3/36
                                    156  ---| |------| |------(L)---
                                           B3/36    B3/34
       GOTO NEXT IF NOT SENSEDRIVER   157  ---| |------(U)---
                                           B3/34    I:0/9    B3/35
                                    158  ---| |------|/|------(L)---
                                           B3/35    B3/34
                                    159  ---| |------(U)---

TIMER TIMER17 TO .4
                                           B3/35    T4:17
                                    160  ---| |------(TON)--
                                                      .4
       GOTO LOOSENCLAMP IF TIMER17        B3/35    T4:17    B3/29
                                    161  ---| |------| |------(L)---
                                           B3/29    B3/35
                                    162  ---| |------(U)---
       GOTO NUTBACKOFF IF SENSEDRIVER     B3/35    I:0/9    B3/34
                                    163  ---| |------| |------(L)---
                                           B3/34    B3/35
                                    164  ---| |------(U)---

DONELOOSENING; * WAIT TILL WRENCH FALLS
           BACK THEN .3 SECONDS
           UNLATCH WRENCHCW
                                           B3/36    O:0/3
                                    165  ---| |------(U)---
           UNLATCH WRENCHCCW                B3/36    O:0/2
                                    166  ---| |------(U)---
           UNLATCH WRENCHFORWARD            B3/36    O:0/4
                                    167  ---| |------(U)---
           TIMER TIMER18 TO .1 IF NOT SENSEWRENC
             HFORWARD
                                           B3/36    I:0/7    T4:18
                                    168  ---| |------|/|-----(TON)--
                                                               .1
           GOTO LOOSEN CLAMP IF TIMER18   B3/36    T4:18    B3/27
                                    169  ---| |------| |------(L)---
                                           B3/27    B3/36
                                    170  ---| |------(U)---

WAITFORBEAM;
           UNLATCH LEFTTRAVERSE             B3/37    O:0/8
                                    171  ---| |------(U)---
           GOTO NEXT IF SENSESAFETYEYE      B3/37    I:0/4    B3/38
                                    172  ---| |------| |------(L)---
                                           B3/38    B3/37
                                    173  ---| |------(U)---

STOPMACHINE;
           RESETALL
                                           B3/38    B3/0
                                    174  ---| |------(U)---
                                           B3/38    B3/1
                                    175  ---| |------(U)---
                                           B3/38    B3/10
                                    176  ---| |------(U)---
                                           B3/38    B3/11
                                    177  ---| |------(U)---
```

```
           B3/38      B3/12
178    ---| |------(U)---
           B3/38      B3/13
179    ---| |------(U)---
           B3/38      B3/14
180    ---| |------(U)---
           B3/38      B3/15
181    ---| |------(U)---
           B3/38      B3/16
182    ---| |------(U)---
           B3/38      B3/17
183    ---| |------(U)---
           B3/38      B3/18
184    ---| |------(U)---
           B3/38      B3/19
185    ---| |------(U)---
           B3/38      B3/20
186    ---| |------(U)---
           B3/38      B3/21
187    ---| |------(U)---
           B3/38      B3/22
188    ---| |------(U)---
           B3/38      B3/23
189    ---| |------(U)---
           B3/38      B3/24
190    ---| |------(U)---
           B3/38      B3/25
191    ---| |------(U)---
           B3/38      B3/26
192    ---| |------(U)---
           B3/38      B3/27
193    ---| |------(U)---
           B3/38      B3/28
194    ---| |------(U)---
           B3/38      B3/29
195    ---| |------(U)---
           B3/38      B3/30
196    ---| |------(U)---
           B3/38      B3/31
197    ---| |------(U)---
           B3/38      B3/32
198    ---| |------(U)---
           B3/38      B3/33
199    ---| |------(U)---
           B3/38      B3/34
200    ---| |------(U)---
           B3/38      B3/35
201    ---| |------(U)---
           B3/38      B3/36
202    ---| |------(U)---
           B3/38      B3/37
203    ---| |------(U)---
           B3/38      B3/38
204    ---| |------(U)---
           B3/38      B3/41
205    ---| |------(U)---
           B3/38      B3/42
206    ---| |------(U)---
           B3/38      O:0/0
207    ---| |------(U)---
           B3/38      O:0/1
208    ---| |------(U)---
           B3/38      O:0/2
209    ---| |------(U)---
```

```
                                              B3/38      O:0/3
                                     210   ---| |------(U)---
                                              B3/38      O:0/4
                                     211   ---| |------(U)---
                                              B3/38      O:0/8
                                     212   ---| |------(U)---
                                              B3/38      O:0/9
                                     213   ---| |------(U)---

GOTO TIGHTEN IF SENSETIGHTENBUTTON
                                              B3/38      I:0/1     B3/10
                                     214   ---| |------| |------(L)---
                                              B3/10      B3/38
                                     215   ---| |------(U)---
GOTO LOOSEN IF SENSELOOSENBUTTON
                                              B3/38      I:0/2     B3/27
                                     216   ---| |------| |------(L)---
                                              B3/27      B3/38
                                     217   ---| |------(U)---
GOTO FCR IF SENSEFORWARDCARRIERROTATE
    BUTTON
                                              B3/38      I:0/11    B3/40
                                     218   ---| |------| |------(L)---
                                              B3/40      B3/38
                                     219   ---| |------(U)---
GOTO NEXT IF SENSEREVERSECARRIERROTAT
    EBUTTON AND (SENSELEFTSTOP OR SENSE
    RIGHTSTOP)
IB3/38 II:0/10 ( II:0/6 OR II:0/0 ) LB3/39
                                              B3/39      B3/38
                                     220   ---| |------(U)---

; * ROTATE CARRIER IN REVERSE
TIMER TIMER19 TO .3
                                              B3/39      T4:19
                                     221   ---| |------(TON)--
                                                          .3
TIMER TIMER20 TO 2.5
                                              B3/39      T4:20
                                     222   ---| |------(TON)--
                                                          2.5
LATCH REVERSECARRIERROTATION IF NOT T
    IMER19 OR TIMER20
                                              B3/39      T4:19     R        T4:20
                                     223   ---| |------|/|------OR ------| |------(L)---
O:0/0
UNLATCH REVERSECARRIERROTATION IF TIM
    ER19 AND NOT TIMER20
                                              B3/39      T4:19     T4:20    O:0/0
                                     224   ---| |------| |------|/|------(U)---
GOTO STOPMACHINE IF NOT SENSEREVERSEC
    ARRIERROTATEBUTTON
                                              B3/39      I:0/10    B3/38
                                     225   ---| |------|/|------(L)---
                                              B3/38      B3/39
                                     226   ---| |------(U)---

FCR; * ROTATE CARRIER FORWARD
    LATCH FORWARDCARRIERROTATION
                                              B3/40      O:0/1
                                     227   ---| |------(L)---
GOTO STOPMACHINE IF NOT SENSEFORWARDC
    ARRIERROTATEBUTTON
                                              B3/40      I:0/11    B3/38
                                     228   ---| |------|/|------(L)---
                                              B3/38      B3/40
                                     229   ---| |------(U)---

GAOUT; * MAKE THE GLUE APPLICATOR GO OUT
    HOLD GLUEAPPLOUT
                                              B3/41      O:0/7
                                     230   ---| |------( )---
UNLATCH GAOUT IF SENSEGLUEAPPLOUT             B3/41      I:0/13    B3/41
```

```
GAIN; * MAKE THE GLUE APPLICATOR GO BACK                       231  ---| |------| |------(U)---
       IN
     LATCH GLUEAPPLIN                                                   B3/42    O:0/6
                                                               232  ---| |------(L)---
     GOTO NEXT IF SENSEGLUEAPPLIN                                       B3/42    I:0/12    B3/43
                                                               233  ---| |------| |------(L)---
                                                                        B3/43    B3/42
                                                               234  ---| |------(U)---

GAIN2;
     UNLATCH ACCNOTREADY                                                B3/43    B3/1
                                                               235  ---| |------(U)---
     UNLATCH GLUEAPPLIN IF NOT SENSEGLUEAP
       PLIN                                                             B3/43    I:0/12    O:0/6
                                                               236  ---| |------|/|------(U)---
     UNLATCH GAIN2 IF NOT SENSEGLUEAPPLIN                               B3/43    I:0/12    B3/43
                                                               237  ---| |------|/|------(U)---

HOLD GAREADYBUTTON WHENEVER NOT LASTBUTT
       ONSTATE AND SENSEREADYBUTTON                                     B3/3     SENSER
                                                               238  ---|/|------| |------( )---
     B3/4
     HOLD LASTBUTTONSTATE WHENEVER SENSEREADY
       BUTTON                                                           SENSER   B3/3
                                                               239  ---| |------( )---
     LATCH OPERATORREADY WHENEVER GAREADYBUTT
       ON AND NOT GLUEAPPLRUN                                           B3/4     O:0/5     B3/2
                                                               240  ---| |------|/|------(L)---
     UNLATCH OPERATORREADY WHENEVER (GAREADYB
       UTTON AND GLUEAPPLRUN) OR NOT SENSE
       STOPWAND
     ( IB3/4 IO:0/5 ) OR NI:0/14 UB3/2
     HOLD GLUEAPPLRUN WHENEVER NOT ACCNOTREAD
       Y AND OPERATORREADY                                              B3/1     B3/2      O:0/5
                                                               241  ---|/|------| |------( )---

Hit ENTER to Continue:
```

What is claimed is:

1. An articulated conveyor system for transporting and gluing wood segments comprising:

first conveying means having a first frame means, the first conveying means supported by said first frame means, the first conveying means having a conveying path;

glue applicating means mounted on said first conveying means comprising:

a glue bath container;

a glue applicator roller mounted in said glue bath container and positioned to be partially immersed in glue contained in the glue bath container;

a doctor roller mounted in said glue bath container to coact with said glue applicator roller to control the quantity of glue carried by the roller for contact with wood passing over the glue applicator roller;

adjusting means on said doctor roller to control the position of the doctor roller to the applicator roller to regulate the thickness of the glue on the applicator roller;

second conveying means comprising:

a second frame means, the second conveying means supported by said second frame means for conveying segments of wood;

transverse frame means positioned perpendicular to the conveying path of the first conveying means; and translation means mounted on said transverse means and said second conveying frame means for permitting transverse movement of the second conveying means along said transverse frame;

drive means mounted to said first frame means for driving said first conveying means, said glue applicator means, and said second conveying means comprising:

motor means;

flexible power transmission means for communicating power from said drive motor;

first conveyor engaging means on said first conveying means engaging said flexible transmission means;

glue applicator engaging means on said glue applicator roller for engaging said flexible transmission means;

doctor roller engaging means on said doctor roller for engaging said flexible transmission means;

coupling means engaged with said flexible transmission means for transmitting power to said second conveying means, said coupling means comprising:

socket means connected to said flexible transmission means;

tongue means extending from said second conveying means adapted to engage said socket means when said socket means is in registration with said wrench means;

means to move said second conveying means across a path of an interfering clamping apparatus from a position in registration with the clamping apparatus to a position outward of the clamping apparatus, to permit the clamping apparatus to move past the second conveying means, comprising:

motor means mounted on said first conveying means;

flexible connecting means connected to said motor means for moving said second conveying means along said translating means perpendicular to the path of said conveying means upon actuation of said motor means;

first and second engaging means on said second frame means for engaging said flexible power transmission means, said first and second engaging means constructed and arranged to enable movement of said second conveying means along the conveying path upon engagement of either said second conveyor means and said translating motor means;

alignment means on said second conveyor means, said alignment means comprising:

primary positioning engaging means engaging said flexible transmission means from said transverse motor means;

shaft means connecting said engaging means;

secondary engaging means on said shaft means, said secondary engaging means engaging said engaging means on the end of said shaft remote from said motor to position said secondary engaging means coincidentally with the position of said primary positioning engaging means;

transverse movement control means to actuate said transverse drive motor to move said second conveying means into registration with said first conveying means;

control means coordinating movement of said transverse motor means with movement of an automated clamp carrier to move said second conveying means out of registration with said first conveying means to allow clearance of an automated clamp carrier and then to move the second conveying means into registration with the first conveying means when an automated clamp carrier has reached an operating position; and sensing and control means to advance said first conveying means a predetermined distance to accommodate loading of said first conveying means.

2. An articulated conveyor system for transporting and gluing wood segments comprising:

first conveyor means having a conveying path;

second conveyor means adapted to move across a path of an interfering clamping apparatus from a position in registration with the clamping apparatus to a position outward of the clamping apparatus;

gluing means associated with at least one of said first and second conveying means;

first drive means to drive said first conveyor means and said second conveyor means;

second drive means to drive said movable conveyor means in a path perpendicular to the conveying path of the first conveying means;

wood clamping apparatus having an operating envelope temporarily overlaying the path of said second conveying means when said second conveying means is in registration with said first conveying means;

control means coordinating movement of said wood clamping apparatus and said articulated conveyor system;

said control means coordinating movement of said wood clamping means with operation of said first and second conveying means; and said control means coacting with said drive means for said first conveyor means and said second conveyor means for moving said second conveyor means in a path perpendicular to said first conveying means.

3. The apparatus of claim 2 wherein the first drive means coacts with the gluing means to drive the gluing means.

4. An articulated conveyor system for transporting and gluing wood segments in coordination with a wood clamping apparatus comprising:

first conveyor means, having a conveying path;

second conveyor means adapted to move across a path of an interfering clamping apparatus from a position in registration with the clamping apparatus to a position outward of the clamping apparatus;

gluing means associated with at least one of said first or second conveyor means;

first drive means to drive said first conveyor means and said second conveyor means;

second drive means to move said movable conveyor means in a path perpendicular to the conveying path with the first conveyor means;

wood clamping means having an operating envelope that periodically interferes with the conveying path of said second conveying means;

control means coacting with said drive means for said first conveyor means and said second conveyor means for moving said second conveyor means in a path perpendicular to said first conveyor means in coordination with said wood clamping means; and said control means coordinating conveying motion of said first and second conveyor means with motion of said second conveyor means perpendicular to said conveying path of said first conveyor means.

5. The apparatus of claim 4 wherein the first drive means coacts with the gluing means to drive the gluing means.

6. An articulated conveyor system for transporting and gluing wood segments comprising:

first conveyor means having a conveying path;

second conveyor means adapted to move across a path of an interfering clamping apparatus from a position in registration with the clamping apparatus to a position outward of the clamp apparatus;

gluing means associated with at least one of said first and second conveying means;

first drive means to drive said first conveyor means and said second conveyor means;

second drive means to move said movable conveyor means in a path perpendicular to the conveying path with the first means;

control means coacting with said first drive means to move said second conveyor means in a path perpendicular to conveying path of said first conveying means; and said control means coordinating conveying motion of said first and second conveyor means with motion of said second conveyor means perpendicular to said conveying path of said first conveying means.

7. The apparatus of claim 6 wherein the first drive means coacts with the gluing means to drive the gluing means.

8. The apparatus as claimed in claim 7 wherein said second drive means comprises chains and sprockets.

9. The apparatus as claimed in claim 8 wherein said means to move said second conveying means perpendicular to the conveying path of the first conveying path comprises a system of pulleys.

10. The apparatus as claimed in claim 9 wherein said system of pulleys further comprises chains coacting with sprockets on the second conveyor means.

11. The apparatus as claimed in claim 10 wherein said control means comprises sensors mounted on said frames and corresponding flags mounted on said second conveyor means.

12. The apparatus as claimed in claim 11 wherein said transverse frame means of said second conveying means comprises of guide rails and bearings.

13. The apparatus as claimed in claim 12 further comprising coupling means including a drive axle connected to said glue applicator roller, a drive sprocket on said second conveyor means connectable with socket means and a chain connecting said drive axle with said socket means.

14. The apparatus as claimed in claim 13 wherein said second drive means comprises a motor and a system of pulleys comprising chains for coacting with sprockets mounted on said second conveyor means.

15. The apparatus as claimed in claim 14 wherein said apparatus further comprises of a coupling means comprising of a socket and a tongue.

16. The apparatus as claimed in claim 7 wherein said flexible power transmission means comprises of chains and sprockets.

17. The apparatus as claimed in claim 16 wherein said means to move said second conveying means perpendicular to the conveying path of the first conveying path comprises of a system of pulleys.

18. The apparatus as claimed in claim 17 wherein said system of pulleys further comprises chains coacting with sprockets on the second conveyor means.

19. The apparatus as claimed in claim 18 wherein said control means comprises sensors mounted on said frames and corresponding flags mounted on said second conveyor means.

20. The apparatus as claimed in claim 19 wherein said transverse frame means of said second conveying means comprises of guide rails and bearings.

21. The apparatus as claimed in claim 20 further comprising coupling means including a drive axle connected to said glue applicator roller, a drive sprocket on said second conveyor means connectable with socket means and a chain connecting said drive axle with said socket means.

22. The apparatus as claimed in claim 21 wherein said second drive means comprises a motor and a system of pulleys comprising chains for coacting with sprockets mounted on said second conveyor means.

23. The apparatus as claimed in claim 22 wherein said apparatus further comprises coupling means comprising a socket and a tongue.

* * * * *